(12) United States Patent
Keskiniva et al.

(10) Patent No.: US 7,522,578 B2
(45) Date of Patent: Apr. 21, 2009

(54) PACKET NETWORK TELECOMMUNICATION SYSTEM

(75) Inventors: Arto Keskiniva, Porvoo (FI); Tommi Auvinen, Espoo (FI); Jouni Purontaus, Espoo (FI)

(73) Assignee: SAP AG, Walldorf (DE)

( * ) Notice: Subject to any disclaimer, the term of this patent is extended or adjusted under 35 U.S.C. 154(b) by 804 days.

(21) Appl. No.: 10/495,999

(22) PCT Filed: Feb. 19, 2001

(86) PCT No.: PCT/FI01/00158

§ 371 (c)(1),
(2), (4) Date: Nov. 10, 2004

(87) PCT Pub. No.: WO01/61940

PCT Pub. Date: Aug. 23, 2001

(65) Prior Publication Data

US 2005/0068936 A1    Mar. 31, 2005

(30) Foreign Application Priority Data

Feb. 17, 2000    (FI)    ................................. 20000362

(51) Int. Cl.
*H04L 12/66* (2006.01)
(52) U.S. Cl. ........................ 370/352; 709/203; 370/466
(58) Field of Classification Search ................ 370/231, 370/385, 352, 353, 354, 356, 366, 367, 465, 370/466, 467, 469, 395.2; 709/220
See application file for complete search history.

(56) References Cited

U.S. PATENT DOCUMENTS 6,304,574 B1 * 10/2001 Schoo et al. ................ 370/401
6,333,931 B1 * 12/2001 LaPier et al. ................ 370/385
6,466,971 B1 * 10/2002 Humpleman et al. ........ 709/220
6,529,475 B1 * 3/2003 Wan et al. .................... 370/231
6,636,504 B1 * 10/2003 Albers et al. ................ 370/352

(Continued)

FOREIGN PATENT DOCUMENTS

EP    0 836 295    4/1998

(Continued)

OTHER PUBLICATIONS

Krause et al. "Mobile service agents enabling intelligence on demand in telecommunications" GLOBECOM, IEEE Global Telecommunications Conference and Exhibition, New York, NY vol. 1, Nov. 18, 1996.

*Primary Examiner*—Brian D Nguyen
(74) *Attorney, Agent, or Firm*—Fish & Richardson P.C.

(57) ABSTRACT

Packet network telecommunication systems, especially Internet Protocol (IP) telephony removes the need of explicit installing of TSP (TAPI service provider) software or other telephony software at each workstation. Application server software or corresponding control software is arranged to take care of all call control actions on behalf of the phone client software so that the phone client software only needs to receive and transmit speech data streams, and to communicate all control messaging from and to the particular phone client software via the communication link between the control software and the phone client software. Since modern operating systems include support for the user interface devices as well as transmitting and receiving real-time data streams, the phone client software does not require any specific interfacing software to be installed on the client workstation.

19 Claims, 7 Drawing Sheets

U.S. PATENT DOCUMENTS

| | | | |
|---|---|---|---|
| 6,690,654 B2 * | 2/2004 | Elliott et al. | 370/260 |
| 6,731,609 B1 * | 5/2004 | Hirni et al. | 370/260 |
| 6,937,597 B1 * | 8/2005 | Rosenberg et al. | 370/356 |
| 6,940,847 B1 * | 9/2005 | Glitho et al. | 370/352 |
| 7,277,424 B1 * | 10/2007 | Dowling | 370/352 |

FOREIGN PATENT DOCUMENTS

| | | |
|---|---|---|
| EP | 0 843 454 | 5/1998 |
| EP | 0 966 145 | 12/1999 |
| WO | WO 98/16051 | 4/1998 |
| WO | WO 99/04540 | 1/1999 |
| WO | WO 99/05590 | 2/1999 |
| WO | WO 00/51299 | 8/2000 |
| WO | WO 00/52901 | 9/2000 |
| WO | WO 00/57621 | 9/2000 |
| WO | WO 01/01615 | 1/2001 |

* cited by examiner

PACKET NETWORK TELECOMMUNICATION SYSTEM

BACKGROUND OF THE INVENTION

1. Field of the Invention

The invention relates to Internet Protocol (IP) telephony and communication systems. Especially, the invention is related to such a system as specified in the preamble of the independent system claim.

2. Description of Related Art

At the time of writing this application, the trend in development of VOIP (Voice over IP) technology is towards integration of all communication technologies within workstations of users, i.e. using conventional personal computers as a terminal for voice and video communication as well as email and fax communication. One important development is the production of the Telephony Application Program Interface (TAPI) for personal computers, which allows developers to use a simple API (application program interface) for adding communication capabilities to their application programs. A typical configuration for a user workstation comprises an application program used for communication, such as for example an IP phone program or a video conferencing program, and a TAPI Service Provider (TSP) program for interfacing the application program to the VOIP network. The TSP program provides the TAPI which the application program uses, and communicates with the VOIP network elements according to H.323 standard and other related standards.

FIG. 1 illustrates a block diagram of an IP telephony system. FIG. 1 shows a VOIP network 50, comprising gatekeepers 51 for controlling connections within a part of the network and gateways 52 for connection of the network to other types of communication networks, for example. Typical VOIP networks utilize the H.323 standard. Such networks are well known for a man skilled in the art, wherefore the network elements of such networks and their functions are not elaborated here any further. FIG. 1 further shows a server unit 10 and a client unit 20. The client unit 20 comprises a TSP unit 12 and an application program 30, which is in this example an IP phone client program 30. The phone client program 30 communicates with the TSP program over the TAPI interface, transferring the call control (CC) information and audio information using the standardized calls of the TAPI interface. The server unit 10 comprises a TSP program for interfacing the server unit to the VOIP network 50, and an application server program 11 for controlling the application programs 30 of the clients 20, for which the server unit 10 is responsible. The application server program can be for example a control program for video-conferencing. The application server program 11 communicates with the TSP program 12 over the TAPI interface, transferring the call control (CC) information and audio information using the standardized calls of the TAPI interface. The application server program typically communicates directly with the client program 30 to control the functioning the client program and to provide such services to the client program, which cannot be realized using the TAPI interface. Typically, the interface A between the client program and the application server program is a proprietary interface of the maker of the application server program 11 and the client program 30.

In a typical installation a server unit 10 controls and provides services to a large number of client units 20. For the sake of clarity, FIG. 1 shows only one client unit 20.

However, this configuration has drawbacks. While the TSP program provides a standardized API for other programs such as the application server or the virtual phone to use, therefore making it easy to program such other programs and facilitating the use of programs from different manufacturers, the TSP program needs to be installed in each device used to access the VOIP network. This is a large drawback in large organizations, where the TSP needs to be installed to hundreds or even thousands of workstations.

SUMMARY OF THE INVENTION

An object of the invention is to realize a packet network telecommunication system, which avoids the problems of prior art. A further object of the invention is to realize a telecommunication system, which allows packet network telephony to be used without need for an explicit installation of preferable any software, especially that of TSP software, on the workstation of each user.

The objects are reached by arranging the application server software or corresponding control software to take care of all call control actions on behalf of the phone client software so that the phone client software only needs to receive and transmit speech data streams, all control messaging from and to the particular phone client software are communicated via the communication link between the control software and the phone client software.

Such an arrangement removes the need of installation of TSP software—and advantageously the need of installation of other telephony software—at each client workstation. Since modern operating systems include support for the user interface devices as well as transmitting and receiving real-time data streams, the phone client software does not require any specific interfacing software to be installed on the client workstation. Furthermore, the phone client software can advantageously be realized using platform independent tools such as the Java programming language, whereby the phone client software can be constructed to be loadable to the client workstation always when the need for using the phone arises. In a particularly attractive embodiment of the invention, the phone client software is realized using Java programming language and constructed to be executable by internet browser programs, whereby a user of a workstation can start to use the IP phone simply by accessing a specific company intranet or public internet page, whereby no explicit installation by computer support personnel is needed at the workstation.

The system for real-time packet network telecommunication according to the invention is characterized by that, which is specified in the characterizing part of the independent claim directed to a system for real-time packet network telecommunication. The server unit according to the invention is characterized by that, which is specified in the characterizing part of the independent claim directed to a server unit. The computer program product according to the invention is characterized by that, which is specified in the characterizing part of the independent claim directed to a computer program product. The dependent claims describe further advantageous embodiments of the invention. The features specified in one dependent claim may be combined with features specified in another dependent claim to produce further embodiments of the invention.

BRIEF DESCRIPTION OF THE DRAWINGS

Various embodiments of the invention will be described in detail below, by way of example only, with reference to the accompanying drawings, of which

A description of FIG. 1 was given earlier in connection with the description of the state of the art. Same reference numerals are used for similar entities in the figures.

DETAILED DESCRIPTION OF THE PREFERRED EMBODIMENTS

A. A First Group of Advantageous Embodiments of the Invention

Figure 1:
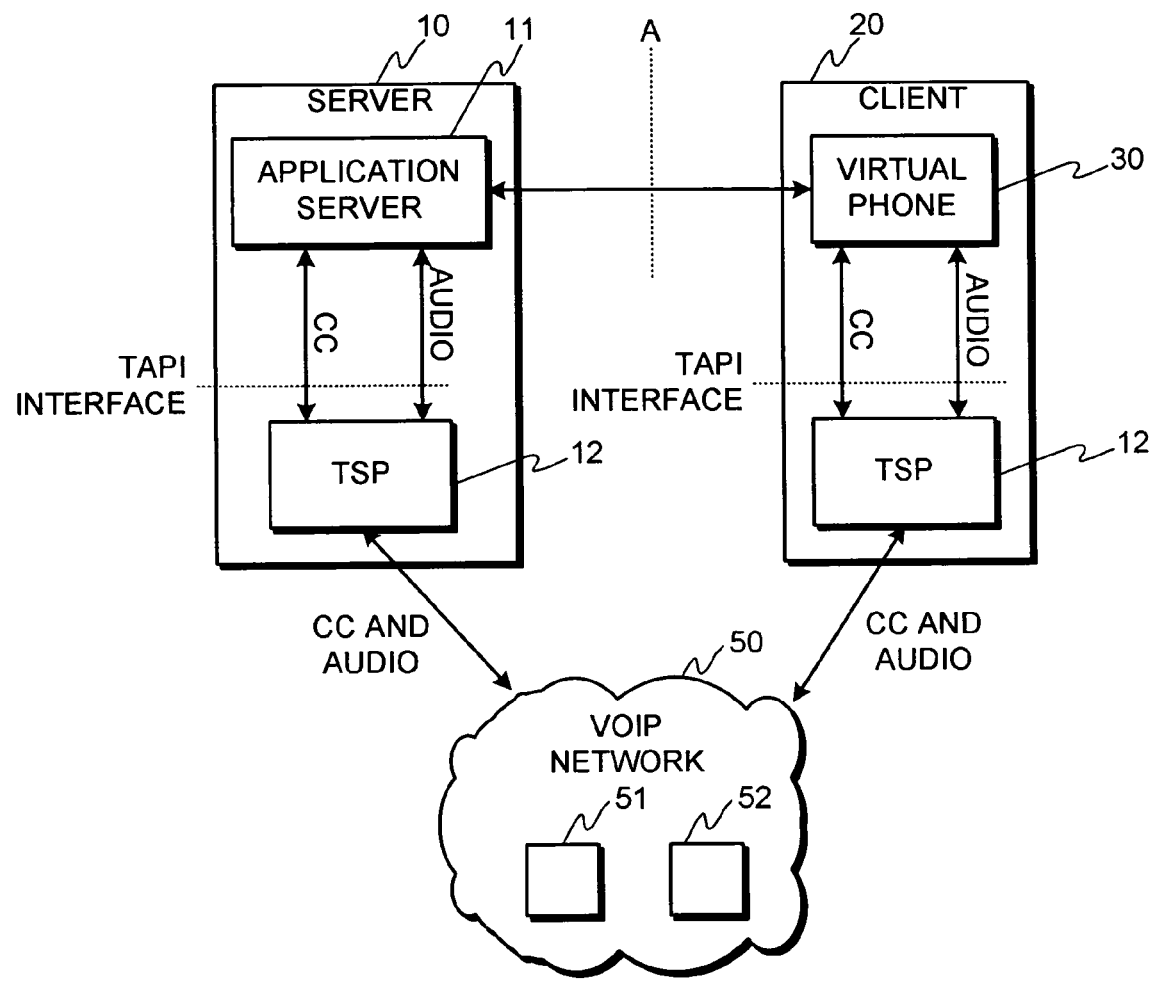
FIG. 1 illustrates an IP telephony system according to prior art.
Figure 2:
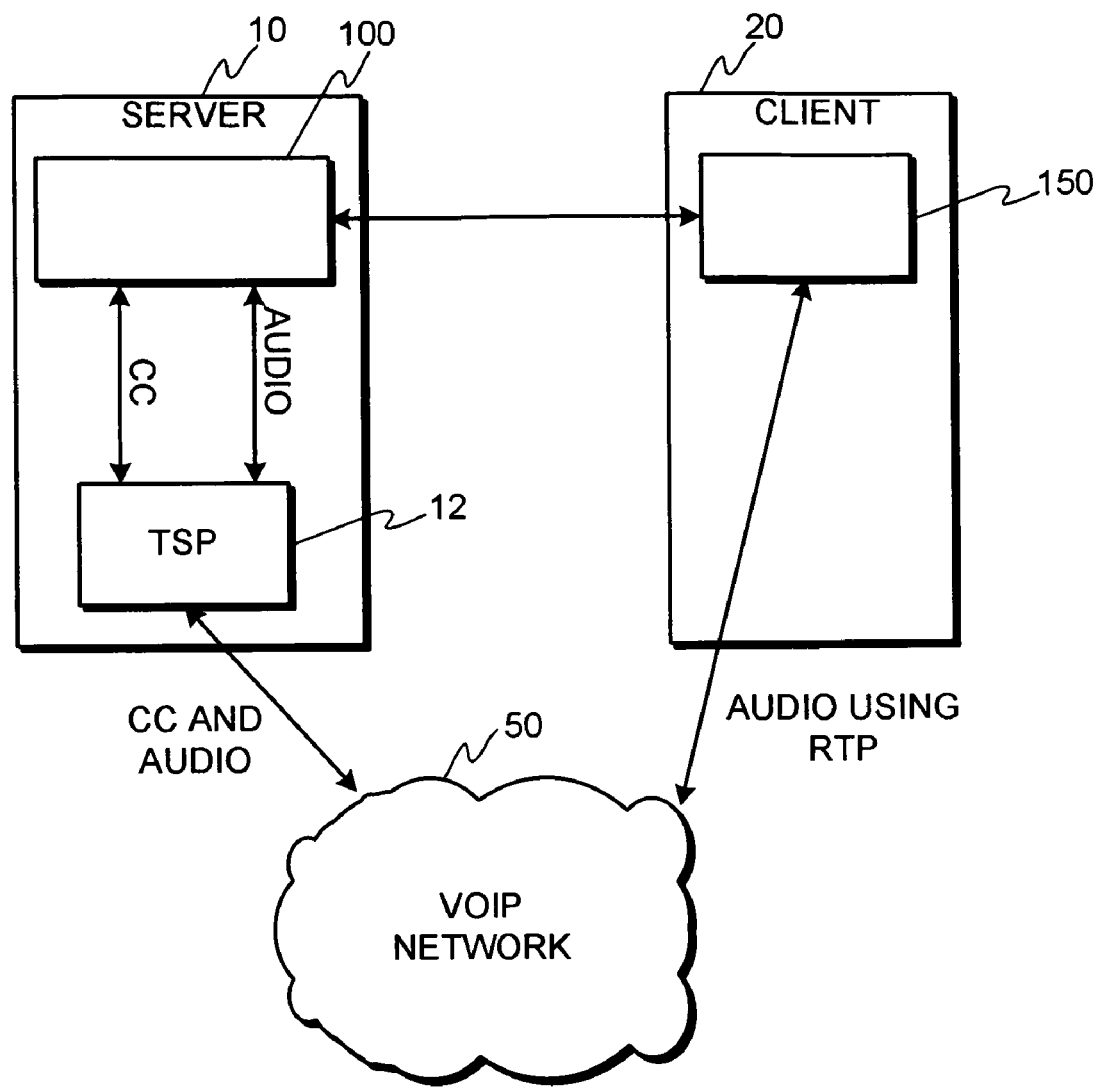
FIG. 2 illustrates a block diagram of a first advantageous embodiment of the invention.

FIG. 2 illustrates a first advantageous embodiment of the invention. FIG. 2 shows a server 10, a client workstation 20 and a packet network such as an IP (internet protocol) network 50. FIG. 2 also shows an interfacing program 12 such as a TSP program 12 and a control program 100 at the server, and the phone client software 150 at the client workstation. According to the invention, the phone client software 150 communicates call control messages to the control program 100, which then directs the network via the interfacing program 12 to perform the necessary call control action. The speech and/or video data stream (or streams) associated with a connection between the client software 150 and the other communicating party is (are) switched in the network directly to/from the client 20 for the client program 150.

In voice-over-IP schemes typical at the time of writing this patent application the network 50 employs the H.323 protocol and related protocols for controlling the real time communications such as voice and/or video transmissions. In the H.323 protocol suite real time data streams are transferred using the real time protocol (RTP), while real time control protocol (RTCP) is used for managing existing RTP streams. Therefore, in a preferred embodiment of the invention the client software 150 only needs to interact directly with the network only via RTP and RTCP protocols.

In a preferred embodiment of the invention, the phone client software 150 uses the interfaces provided by the operating system of the client workstation 20 for using the user interface such as the loudspeakers and the microphone, and for transmission and reception of RTP traffic. However, it is clear for a man skilled in the art that additional interface programs can be used between the operating system interfaces and the phone client software without departing from the spirit of the invention. In a preferred embodiment of the invention no such additional interface programs are used, since many widely used operating system already provide the needed interfaces for the user interface as well as for transmission and reception of RTP traffic. For example, at the time of writing this patent application, current versions of the Windows NT and Windows 2000 operating systems provide support of a microphone and loudspeakers in the form of an API.

Although FIG. 2 illustrates call control and audio streams between the control program 100 and the interfacing program 12, use of audio streams at the server end is not necessary in all embodiments of the invention.

B. A Second Group of Advantageous Embodiments of the Invention

Figure 3:
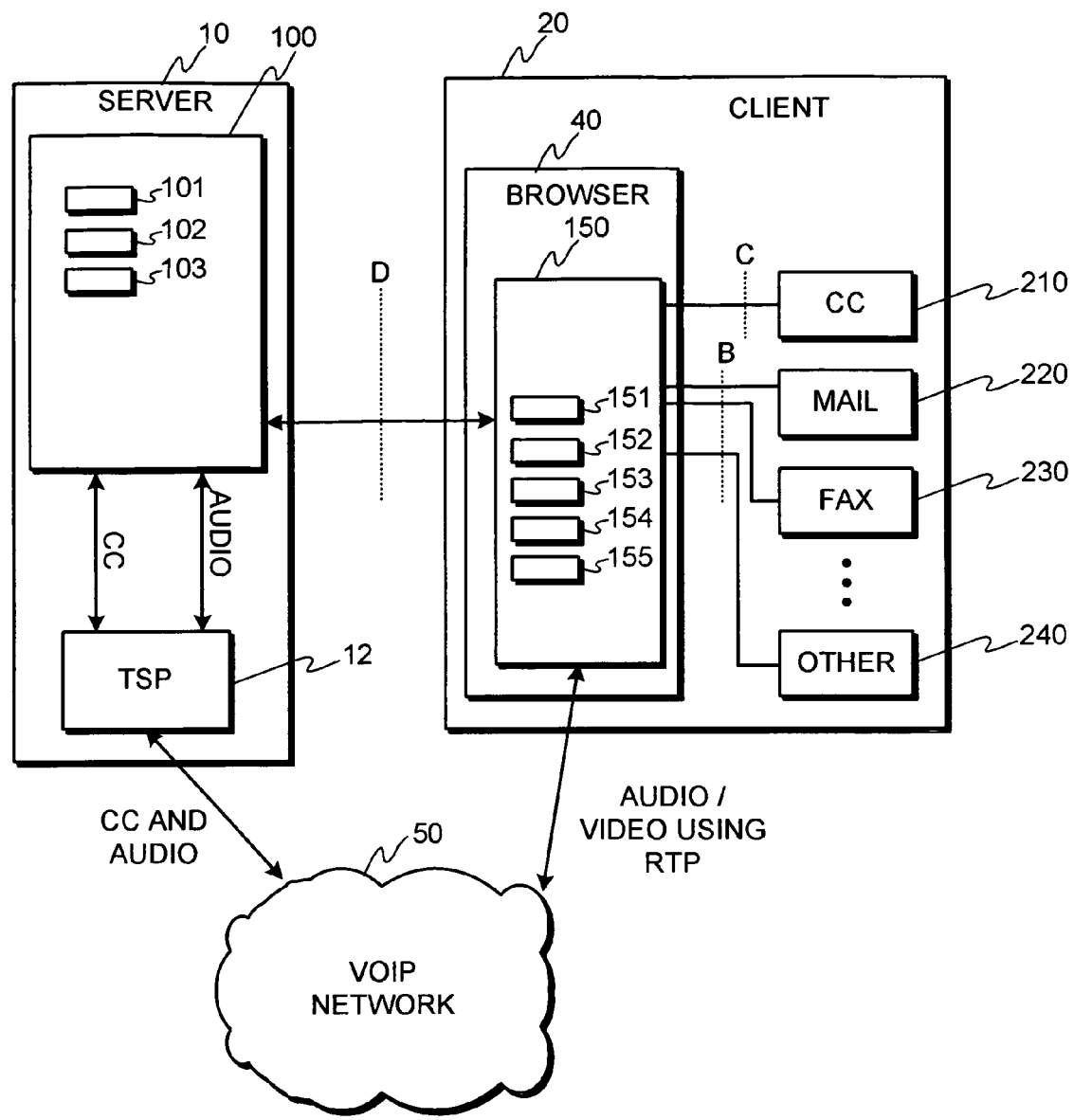
FIG. 3 illustrates a block diagram of a second advantageous embodiment of the invention.

FIG. 3 illustrates a second advantageous embodiment of the invention. FIG. 3 shows a server 10, a client workstation 20 and a packet network such as an IP (internet protocol) network 50. FIG. 3 also shows an interfacing program 12 such as a TSP program 12 and a control program 100 at the server, and the phone client software 150 at the client workstation. FIG. 3 illustrates such an embodiment, in which the client software is used to tunnel further protocols and modes of communication between other software modules 210, 220, 230, 240 at the client software and the control unit 100, which then communicates with the rest of the network as necessary. Such an arrangement can be used to provide different types of communication facilities in addition to audio or audio and video, such as for example email or fax communication. In such an embodiment, real-time data streams such as audio or video data streams are communicated from the client software 150 directly to the network 50, and the other types of communication are transferred via interface D and the control program 100. With such an arrangement, the client software 150 does not need to be capable of communicating with the network 50 in many different ways. FIG. 3 also illustrates, that the client software 150 can provide one or more interfaces for communication with other software at the client unit 20, such as email software 220, fax software 230 or other types of communication software 240. For example, the client software can communicate with the mail software of the client workstation using the well-known MAPI (mail application program interface).

Further, in an advantageous embodiment of the invention, the client software 150 provides an interface C for call control, which can then be used by separate call control 210 modules. The client software 150 then communicates the call control messages from interface C to the control unit 100, and the reply messages in the opposite direction. Such a public call control interface allows third party developers to produce call control software, which are compatible with the client software 150. For example, the user may wish to use a different user interface for call control than the one provided by the client software 150. Further, in such an embodiment, it is not necessary for the client software 150 to comprise a call control user interface, if all such client workstations 20 where that particular version of client software is installed have the external call control software module 210.

In a further advantageous embodiment, the client software is arranged to forward messages of any kind between the control unit 100 and other software modules at the client workstation. To this end, the control unit 100 and the client software have in this embodiment a communication channel in the interface D between the control unit and the client software for transferring of free-format messages. The client software merely forwards any messages from the channel to a specific interface for other software modules and vice versa. Such an arrangement can be used for creating new services on top of the real-time telecommunication system.

The inventive arrangement allows an easy deployment of real-time packet network telecommunications technology within an organization. One workstation used as the telecommunications server needs to be fitted with software for a control unit 100 and in the case that the control unit uses the TAPI interface, the workstation is also fitted with a TSP program 12. Since call control messages are communicated to and from the clients via the application server, the client does not need to communicate directly with the network other than with the real time data streams, wherefore no TSP program is needed.

FIG. 3 also illustrates such an advantageous embodiment of the invention, in which the client software 150 is realized using downloadable program code elements which are executable by intranet or internet browser software 40. Such program code can be for example Java code either in uncompiled or as compiled bytecode form, or for example so-called active-X binary code modules. These are the most common types of downloadable modules which can be executed within browser programs, but it is clear for a man skilled in the art, that other code module types can also be devised for similar purposes, wherefore the invention is not limited to only Java or active-X components. The present embodiment makes the deployment of client software 150 to large numbers of workstations very easy: a user can obtain the software merely by accessing a certain intranet or internet web page, whereby the client software 150 is transferred to the client workstation, and the user can start to use the telecommunication facilities provided with the help of the client software 150.

FIG. 3 also illustrates means 151 for receiving and transmitting a real-time data stream using the real time protocol, means 152 for transmitting call control commands to the control unit, means 153 for receiving call control commands from the control unit, means 154 for receiving control messages from the control unit and for transmitting control messages to a second client program 210, 220, 230, 240, and means 155 for providing an application program interface for other computer program products. These means are advantageously realized using computer program code elements. Further, FIG. 3 also illustrates various means in the control unit 100, such as means 101 for sending call control commands to the client unit, means 102 for receiving call control commands from the client unit, and means 103 for transmission of call control commands to a network element in a real-time packet telecommunication network for controlling of transmission of real-time data streams to the client unit and from the client unit. These means are advantageously realized using computer program code elements.

C. A Third Group of Advantageous Embodiments of the Invention

According to a further aspect of the invention, a system for real-time packet network telecommunication having a server unit is provided, which server unit has a control unit and an interfacing unit, said interfacing unit providing an application program interface for use by other programs, which system has a client unit, which client unit has a computer program product for real-time telecommunication. According to an advantageous embodiment of the invention, the system comprises at least in the computer program product, means 151 for receiving and transmitting a real-time data stream using the real time protocol, in the computer program product, means 152 for transmitting call control commands to a control unit, in the computer program product, means 153 for receiving call control commands from said control unit, in the control unit, means 101 for sending call control commands to the computer program product, in the control unit, means 102 for receiving call control commands from the computer program product, and in the control unit, means 103 for transmission of call control commands to a network element in a real-time packet telecommunication network for controlling of transmission of real-time data streams to the computer program product and from the computer program product.

The real-time data stream is advantageously an audio or a video data stream. In a further advantageous embodiment of the invention, the means for receiving and transmitting a real-time data stream is arranged to receive and transmit a plurality of real-time data streams. For example, the means can receive and transmit an audio and a video data stream for a video conferencing session.

According to a further aspect of the invention, a server unit for a real-time packet network telecommunication system is provided, which server unit has a control unit for controlling of client applications and an interfacing unit for connection to a real-time packet telecommunication network and for providing an application program interface for use by other programs. According to an advantageous embodiment of the invention, the server unit comprises in the control unit, means 101 for sending call control commands to a client unit, in the control unit, means 102 for receiving call control commands from said client unit, and in the control unit, means 103 for transmission of call control commands to a network element in a real-time packet telecommunication network for controlling of transmission of real-time data streams to the client applications and from the client applications.

According to a further aspect of the invention, a computer program product for a client unit of real-time packet network telecommunication system is provided. According to an advantageous embodiment of the invention, the computer program product comprises at least computer program code means 151 for receiving and transmitting a real-time data stream using the real time protocol, computer program code means 152 for transmitting call control commands to a control unit, and computer program code means 153 for receiving call control commands from said control unit.

According to a further advantageous embodiment of the invention, the computer program product further comprises at least computer program code means 154 for receiving control messages from said control unit and for transmitting said control messages to a second client program 210, 220, 230, 240.

According to a further advantageous embodiment of the invention, the computer program product is downloadable and executable by a browser program 40.

According to a further advantageous embodiment of the invention, the computer program product is realized using the Java programming language.

According to a further advantageous embodiment of the invention, the computer program product is embodied on a computer readable medium. The computer readable medium can be for example a magnetic or magneto-optical mass storage media such as a diskette, a hard disk, a CD-ROM disc, or for example a DVD disc. The computer readable medium can as well be an electronic media such as a flash memory, or for example the random access memory (RAM) of the client workstation or another computer. As a man skilled in the art, computer program products can be stored on many different types of media, wherefore the invention is not limited to the product being stored on any specific media or a set of specific types of media, and the aforementioned types of media are only meant as examples of storage media widely used at the time of writing this patent application.

According to a further advantageous embodiment of the invention, the computer program product further comprises at least computer program code means 155 for providing an application program interface for other computer program products.

According to a further advantageous embodiment of the invention, the computer program product it comprises computer program code means 155 for providing an application program interface for call control software.

D. A Fourth Group of Advantageous Embodiments

Figure 4:
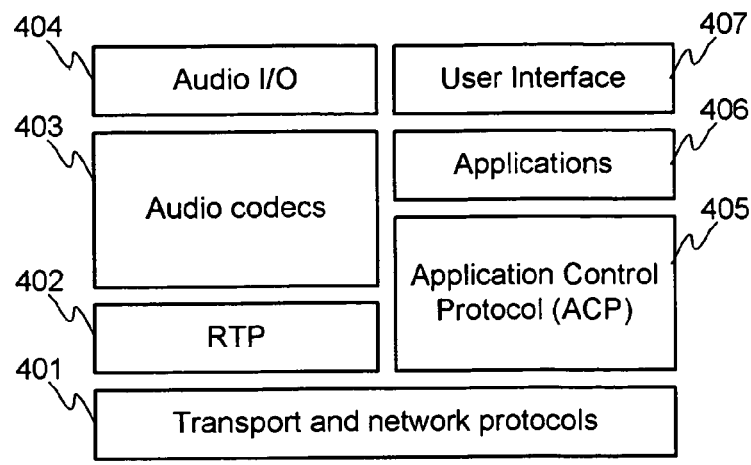
FIG. 4 illustrates protocol architecture of a third advantageous embodiment of the invention.

FIG. 4 illustrates protocol architecture of a third advantageous embodiment of the invention. Signaling and data are transmitted in a packet data network using transport and network protocols; this is illustrated with block 401 in FIG. 4. Examples of these protocols are TCP/IP and UDP/IP. A coded audio data stream is typically transmitted using RTP (block 402 in FIG. 4). The audio codecs (block 403) are used to encode, for example, sampled speech, and to decode encoded audio data. Examples of suitable codecs are audio codecs G.711, G.723 and G.729, which are defined in ITU-T Recommendations having the same identifiers. The Audio I/O block 404 illustrates presentation of a decoded audio stream to a user and sampling of an audio stream to be encoded.

On the application side there is an Application Control Protocol ACP 405, which typically comprises a number of control messages. These control messages are typically generated and processed by Telephony Applications (block 406), which are the control applications in packet network telecommunication systems according to the third advantageous embodiment of the invention, and by the User Interface 407. Telephony applications reside typically on a server in a packet data telecommunication network. The User Interface UI 407 is an interface to control the Telephony Applications, and it usually resides on a workstation. Advantageously a User Interface and a Telephony Application communicate using an Application Control Protocol.

Figure 5:
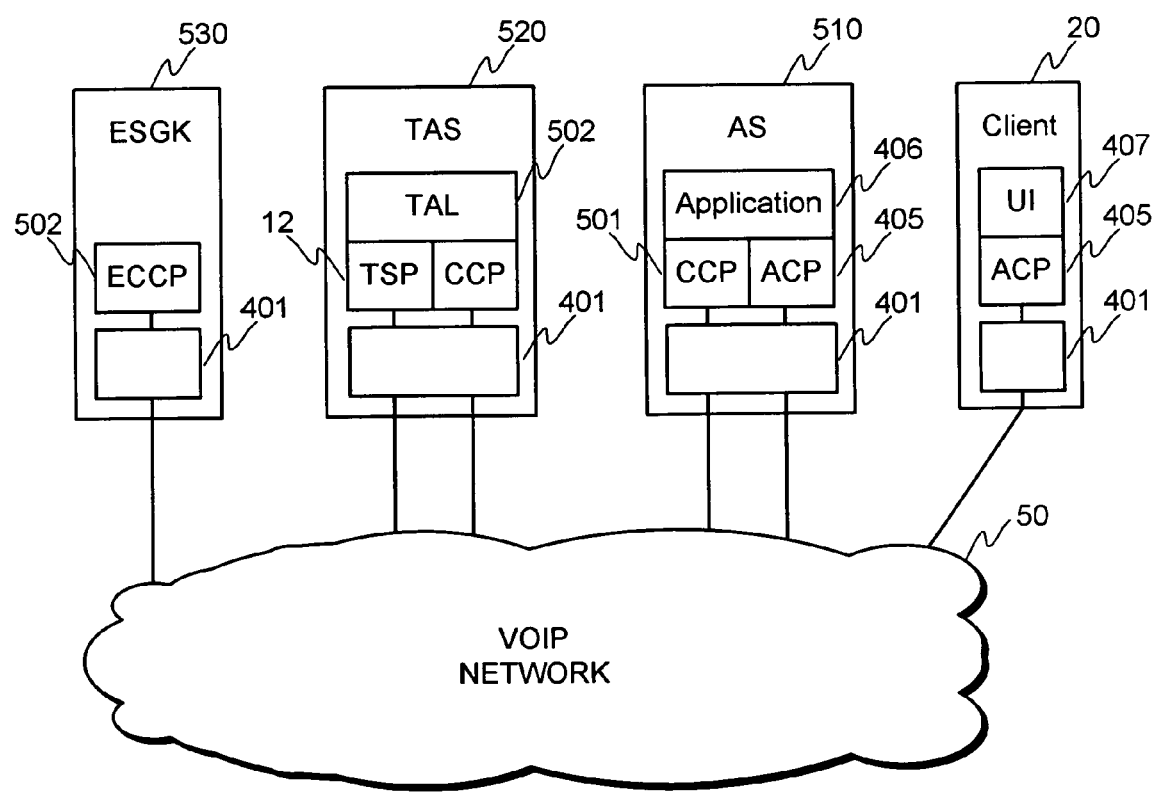
FIG. 5 illustrates schematically signaling plane of a fourth advantageous embodiment of the invention, where protocol architecture illustrated in FIG. 4 is used.

FIG. 5 illustrates schematically a signaling plane of a fourth advantageous embodiment of the invention, where the protocol architecture illustrated in FIG. 4 is used. In this embodiment, a control program 100 is implemented using as a Telephony Application 406, which resides on an Application Server AS 510, and as a TSP Adaptation Layer TAL, which resides on a TSP Adaptation Server TAS 520. The Telephony Application 406 and the TSP Adaptation Layer communicate using a Call Control Protocol CCP 501. The messages of this Call Control protocol advantageously form a subset of messages belonging to the Application Control Protocol 405. The TSP Adaptation Layer uses a TAPI provided by the TSP 12. The TSP, in turn, exposes an External System Gatekeeper ESGK 530, which uses External Call Control Protocol ECCP 502, when it communicates, for example, with other External System Gatekeepers or External System Gateways. An External System Gateway (not illustrated in FIG. 5) connects a packet data telecommunication network 50 to another telephony network. This other telephony network may be, for example, a PSTN, an ISDN or a H.323 network.

In this third advantageous embodiment of the invention, the External System Gateways and External System Gatekeepers may be any standard gateways and gatekeepers. The TSP Adaptation Server 520, the Application Server 510 and the Client 20 are network elements, where the present invention is applied. It is possible that an External System Gatekeeper, which has TSP software providing TAPI, is modified so that it contains the TSP Adaptation Layer 502 and Call Control Protocol entity 501. In other words, it is possible that the ESGK 530 and TAS 520 are implemented as a single network element.

Figure 6:
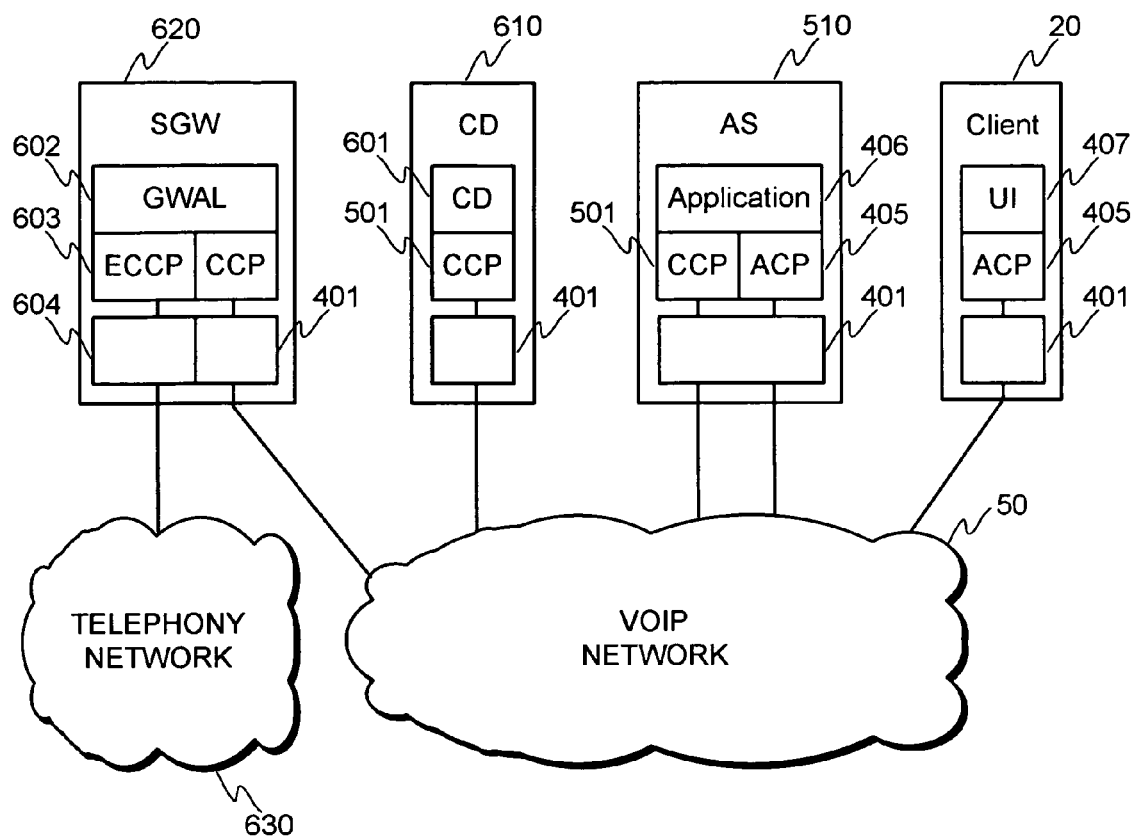
FIG. 6 illustrates schematically signaling plane of a fifth advantageous embodiment of the invention, where protocol architecture illustrated in FIG. 4 is also used.

FIG. 6 illustrates schematically the signaling plane of a fifth advantageous embodiment of the invention, where the protocol architecture illustrated in FIG. 4 is also used. TSP software or TAPI are not needed in this fifth advantageous embodiment, as there is a Call Dispatcher CD 610, which is responsible for call routing functions. This Call Dispatcher 610 communicates with Application Server 510 and with System Gateway SGW 620 advantageously with a Call Control Protocol, whose messages form a subset of messages belonging to the Application Control Protocol. The Call Dispatcher software 601 is performing the call routing, and typically information about routing is stored in a database. The System Gateway 620 connects the packet data telecommunication system according to the fifth advantageous embodiment to another telephony network 630, for example, to a PSTN, an ISDN or a H.323 network. The System Gateway 620 communicates with the other telephony network 630 using an External Call Control Protocol ECCP entity 603. A Gateway Adaptation Layer GWAL 602 converts ECCP messages to CCP messages. The transport and network protocols 604 may be different from the protocols 401. The ECCP may be, for example, H.323 protocol. It is possible that the CD 610 comprises further a converter between CCP and ECCP. In this case, the CD communicates with a gateway element, which is typically a standard gateway element, using ECCP.

In a packet network telecommunication system according to the fifth advantageous embodiment all network elements, i.e. SGW 620, CD 610, AS 510 and Client 20, communicate with each other using either Call Control Protocol or Application Control Protocol.

In a packet network telecommunication system according to the invention, an Application Server 10, 510 acts on the Clients 20 behalf. To the rest of the packet network telecommunication system the Application Server 10, 510 appears to be the originator or the destination of call control messages. This means that only an Application Server exchanges Call Control Messages with a Client. On the other hand, as described above, the data streams to or from an external network, for example RTP streams, are usually transmitted between a Client 20 and a gateway element or between two (or more, if the call is a conference call) Clients 20. An application server is typically not involved in processing audio and video data streams. If Client 20 establishes a connection to another client, which is attached to the same application server, the data streams between these two clients are transmitted directly.

The functionality of a Telephony Application depends on the type of the application. Some examples of Telephony Applications advantageously implemented using a packet network telecommunication system according to the invention are a switchboard, an Interactive Voice Response (IVR) and/or a call center. The functionalities of these are known to a man skilled in the art, and they are therefore not discussed here in more detail.

The Application Control Protocol, and advantageously also the Call Control Protocol, which forms a part of the Application Control Protocol, is advantageously a string-based statefull protocol. The Call Control Protocol comprises messages relating to call control commands and events occurring in calls. The Application Control Protocol typically comprises all the call control messages of the Call Control Protocol and, in addition, application control messages, which typically relate to interaction between the User Interface and the Telephony Application carried out to control the Telephony Applications. Some examples of controlling a Telephony Application are inlogging to a system, change of a password or change of profile information. Profile information is a concept known to a man skilled in the art, and it may specify, for example, which calls are accepted, where to forward calls, or which tones are related to which callers.

Advantageously the Call Control Protocol messages are string-based and comprise a number of pairs, each pair indicating a key word and its value. If there are messages corresponding to commands and events, there advantageously is in each call control message either a certain key word indicating that the message is a command message or a certain other key word indicating that the message is an event message. The value issued to the key word then defines, which call control command or which event the call control message represents.

In addition to these keywords indicating the type of a call control message, there may be various parameter-value pairs in call control messages. As call control messages typically relate to a certain call, each call control message typically comprises a call identifier parameter and a value for this parameter. There may be two kinds of call identifier parameters: each call handled in a packet network telecommunication system is assigned a first call identifier, and those calls, whose other (or one, if the call is a conference call) endpoint is outside a packet network telecommunication system according to the invention, are given second call identifiers, for example, in a gateway element or by a Call Dispatcher. Typically an Application Server 10, 510 binds the first identifiers with the calls. A further example of a parameter typically comprised in each call control message is an identifier of a gatekeeper element (CD, EGK) or of a gateway element. The gatekeeper identifier is usually relevant to call control commands and the gateway identifier to events.

Some examples of call control messages relating to call control commands are messages corresponding to a client accepting a call, a client rejecting a call, connecting a call, redirecting a call, putting a call on hold, releasing a call from hold, and disconnecting a call. Various other call control commands, very well known to a man skilled in the art, can also be implemented as call control messages. The relevant parameters for these command messages vary. Some examples, in addition to the ones presented above, are the following parameters: caller number, number to be called, packet network address (e.g IP address and port) for a RTP data stream, codec used in a call.

Some examples of call control messages relating to events are messages indicating that a call is coming, a call is connected, a call is disconnected or a call rejected. Furthermore, as a call has states, there advantageously are call control messages indicating also a call states. Examples of call states are idle, accepted, proceeding, onhold and unheld.

If the Telephony Applications involves Dial Tone Multiple Frequency (DTMF) and/or IVR functionality, there typically are specific call control commands and specific parameters relating to these functionalities.

Advantageously the call control messages comprise also messages using which a RTP data stream (or other packet data stream) is opened and closed. These messages typically comprise the following parameters: first or second call identifier, IP address, port number, compression information and codec information. When RTP data stream is controlled using call control messages, it is possible to have a system where the Real Time Control Protocol is not needed. This simplifies the functionality of a Client 20. In general, it is possible to control RTP data stream using call control commands and/or RTCP.

Using string-based call control messages, each of which comprises typically one keyword-value pair and a keyword-value-dependent number of parameter-value pairs has a number of advantages. One of them is that string-based messages are flexible and easy to modify. In a packet network telecommunication system presented in FIGS. 5 and 6 the call control messages are typically transmitted between Client 20 and Application Server 510, and between Application Server 510 and TSP Adaptation Server 520 or Call Dispatcher 610, and between Call Dispatcher 610 and SGW 620. As the call control message proceeds, each network node may easily add more parameters to the message (see example below for more details). A second advantage is that it is easy to enhance the Call Control Protocol. If there is need to specify new messages, this can be done easily by defining new values for keywords. New types of messages can be defined by defining new keywords. New parameters and parameter values are similarly easy to define. Furthermore, interoperability between old and new versions (when old and new versions are, for example, used heterogeneously in large systems) of above-described Call Control Protocol or Application Control protocol is easy: a receiver may simply ignore unsupported parameters or messages types, and act according to the parameters or messages it recognizes.

Figure 7:
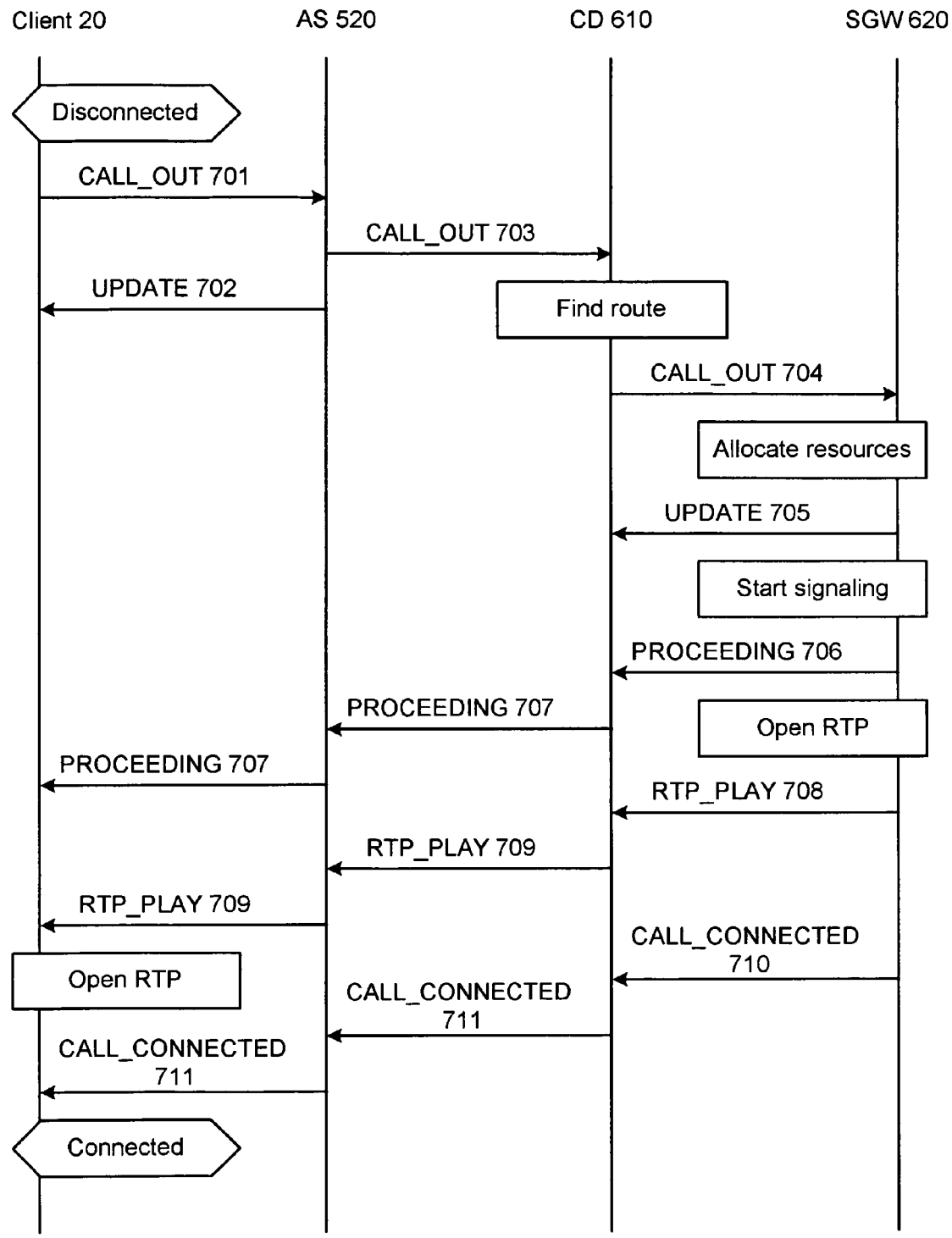
FIG. 7 illustrates a message sequence chart relating to establishing a connection in a system according to the fifth advantageous embodiment of the invention.

FIG. 7 illustrates as an example a message sequence chart relating to establishing a connection in a system according to the fifth advantageous embodiment of the invention. A Client 20 is at first in a disconnect state. A user selects via User Interface an endpoint to which a call is to be made. The User Interface then generates a CALL_OUT(Bnbr) call control message 701. The parameter Bnbr of this message 701 is the number to be called, and the value of this is, for example, a conventional PSTN number. Application Server 510 receives message 701, and binds a Call_ID parameter value to this call. It sends to the User Interface an UPDATE(Call_ID, Bnbr) message 702 which has parameters Call_ID and Bnbr and their values. The order of parameters may vary. The Application Server 510 sends to a Call Dispatcher 610 a CALL_OUT (Anbr, Bnbr, Call_ID) call control message 703. This message is similar to message 701, except for having the following additional parameters and their values: Anbr and Call_ID. The value of parameter Anbr identifies the Client 20 making the call. The Call Dispatcher finds a route to the number to be called, and sends CALL_OUT(Anbr, Bnbr, IP address, Port, Codec) call control message 704 to the relevant Gateway 620. The Gateway 620 allocates resources for the call; these resources may be, for example, resources relating to coding (or to decoding and re-coding) data streams. The IP_address and Port parameter values tell to the SGW 620 the address of port for delivering RTP stream to the caller Client.

Thereafter the Gateway 620 sends an UPDATE(Call_ID, CID) call control message 705 to the Call Dispatcher. This message typically has a Call_ID parameter (the first call identifier assigned by the AS) and a CID parameter (second call identifier assigned by the GW). The Call Dispatcher uses this message to link together the first and second call identifiers. The Gateway 620 starts signaling to connect the call to the called number and, as the signaling proceeds, it informs the CD with a PROCEEDING(CID) call control message 706. The CD changes the CID parameter to Call_ID parameter and transmits the PROCEEDING(Call_ID) call control message 707 to AS 520. It typically transmits the PROCEEDING(Call_ID) call control message 707 further to the Client. When a call is established to the SGW 620, the SGW 620 sends a RTP_PLAY(CID IP address, Port, Codec, QoS) call control message 708 to CD 610. QoS parameter refers to Quality of Service. The IP address and port number refer to those of the Gateway. This information is forwarded to the Client, so that is knows where to send packet data streams relating to this connection. The CD 610 sends RTP_PLAY (Call_ID, IP address, Port, Codec, QoS) call control message 709 to the AS 510, which in turn forwards it to the Client. After receiving this message, the Client 20 prepares itself to receive RTP stream at the port specified in the CALL_OUT message 704. This port may have a default value, so that the Client knows it automatically or the AS, for example, may select this port and inform both the Client and the CD about the number of the port (using, for example, messages 702 and 703) If the packet data network system support other media, it is possible that RTP stream carries multimedia data stream.

When RTP session is established, the SGW 620 sends a CALL_CONNECTED(CID) call control message 710 to the CD 610, which changes the second call identifier parameter to the first call identifier parameter and forwards the CALL_CONNECTED(Call_ID) call control message 711 to the AS 510. The AS 510 forwards to the message 711 to the Client 20.

Figure 8:
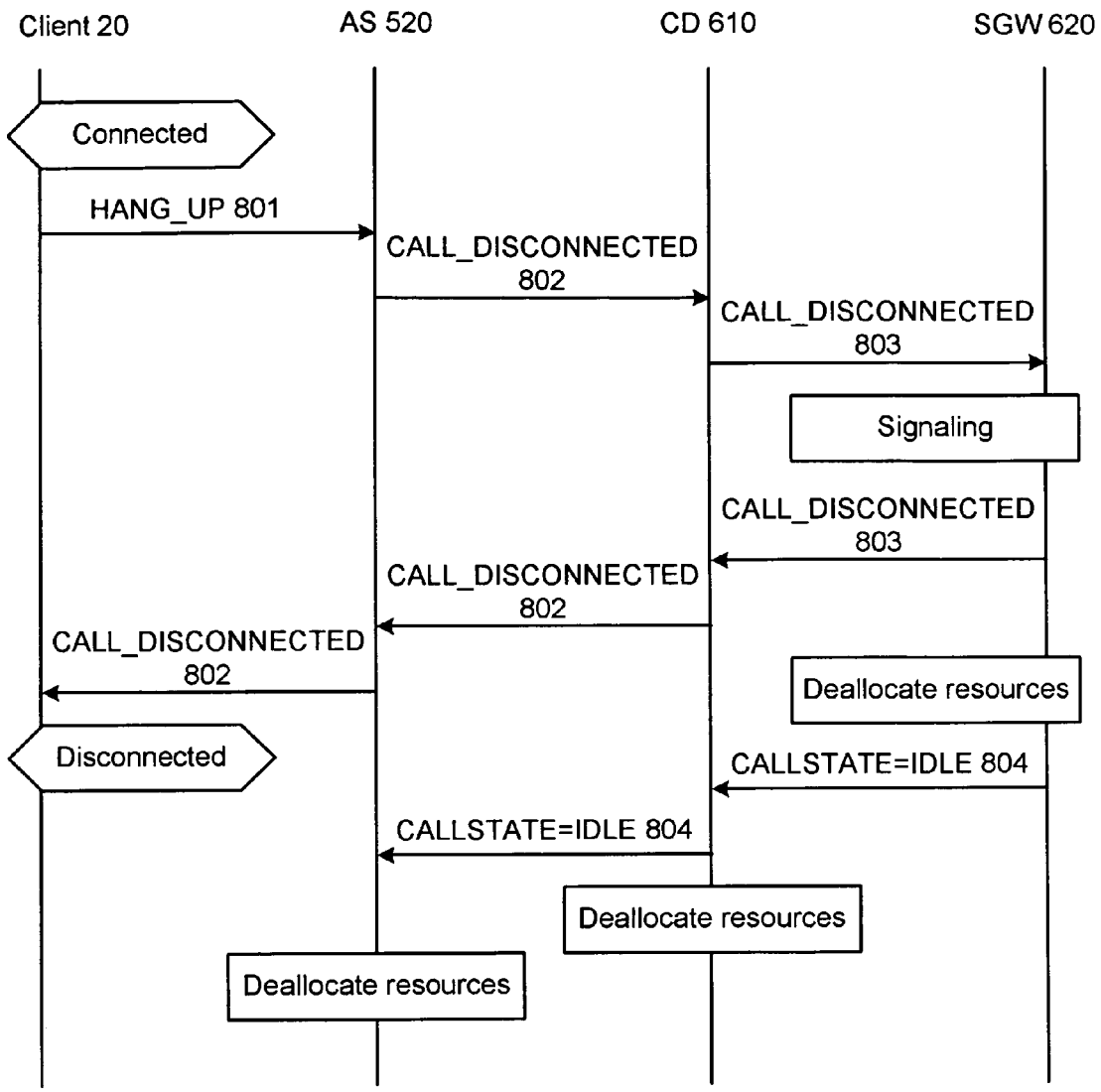
FIG. 8 illustrates a message sequence chart relating to releasing a connection is a system according to the fifth advantageous embodiment of the invention.

FIG. 8 illustrates as an example a message sequence chart relating to releasing a connection in a system according to the fifth advantageous embodiment of the invention. Client 20 sends a HANG_UP(Call_ID) call control message 801 to Application Server 510. The Application server 510 thereafter generates a CALL_DISCONNECTED(Call_ID) call control message 802 relating to an event and transmits it to the CD 610. The CD 610 changes the call identifier and sends a CALL_DISCONNECTED(CID) message 803 to the SGW 620. After relevant signaling towards the other telecommunication network, SGW 620 typically responds with the same message 803 to the CD 610. The CD 610 thereafter sends message 802 to the AS 520, and the AS 520 forwards this message 802 to Client 20. After the SGW 620 has deallocated resources relating to this call, it sends a message 804, this message indicating that the state of the CID call is idle, to CD 610. The CD 610 typically forwards this message 804 to the AS 510. The HANG_UP message typically also triggers call control messages relating to closing of a RTP stream. These messages are not presented in FIG. 8.

A call or connection between two Clients, which are both communicating with a certain Application Server using ACP, is typically handled in a similar manner as presented in FIGS. 7 and 8, but the signaling between the CD 610 and SGW 620 is omitted, as the SGW 620 is not involved in the call/connection. If a first Client is communicating with a first AS using ACP and a second Client is communicating with a second AS using ACP, the call control messages 703, 707, 708, 710, 802 and 804 (or corresponding messages) are typically transmitted between the first and second Applications Servers via a CD. It is possible that a plurality of packet network telecommunication systems according to the invention, each of which typically has one Call Dispatcher, are connected together directly or with intermediate gateways such as SGW 620, see FIG. 6. In this case, there may be more than one Call Dispatcher involved in the signaling.

The names and order of the call control messages illustrated in FIGS. 7 and 8 are examples. The parameters of the call control messages may be different from those presented in connection with FIGS. 7 and 8.

The examples presented in FIG. 7 and 8 correspond to the system presented in FIG. 6. Using these examples, a man skilled in the art is capable to determine proper signaling for a system presented in FIG. 5.

In view of the foregoing description it will be evident to a person skilled in the art that various modifications may be made within the scope of the invention. While certain preferred embodiments of the invention have been described in detail, it should be apparent that many modifications and variations thereto are possible, all of which fall within the true spirit and scope of the invention.

The invention claimed is:

1. A system for packet network telecommunication having a server unit, which has a control unit, and a client unit, which has a computer program product, embodied on a computer readable medium having computer program code stored thereon, for telecommunication, said system comprising at least
   in the computer program product, computer program code for receiving and transmitting, over a packet telecommunication network to a communication device that is different than the server unit, a data stream using a certain protocol supporting voice data transmission,
   in the computer program product, computer program code for transmitting, over a communication channel to the control unit, first call control commands that are in a first format, the communication channel being different than the packet telecommunication network,
   in the control unit, computer program code for receiving, over the communication channel from the client unit, the first call control commands that are in the first format,
   in the control unit, computer program code for modifying the first call control commands received from the client unit in the first format to a second format used by a network element in the packet telecommunication network, the network element being different than the communication device,
   in the control unit, computer program code for directing the network element to perform a call control action that enables establishment of a connection, over the packet telecommunication network, between the client unit and the communication device by transmitting, over the packet telecommunication network to the network element, the modified first call control commands,
   in the control unit, computer program code for receiving, over the packet telecommunication network from the network element, second call control commands that are in the second format,
   in the control unit, computer program code for modifying the second call control commands received from the network element in the second format to the first format,
   in the control unit, computer program code for transmitting, over the communication channel to the client unit, the modified second call control commands,
   in the computer program product, computer program code for receiving, over the communication channel from the control unit, the modified second call control commands, and
   in the computer program product, computer program code for, based on the modified second call control commands, transmitting, directly to the packet telecommunication network, the data stream for delivery to the communication device.

2. A system according to claim 1, characterized in that the call control commands comprise call-control-command specific parameters and the control unit is arranged to modify a call control command by changing parameters of the call control command.

3. A system according to claim 2, characterized in that at least one call control command comprises a plurality of data fragment pairs, each data fragment pair indicating a parameter identity and a parameter value.

4. A system according to claim 1, characterized in that the control unit is arranged to forward third call control commands received from the computer program product to the network element and to forward fourth call control commands received from the network element to the computer program product.

5. A system according to claim 1, characterized in that it further comprises a call routing unit arranged to perform call routing, and in that the server unit and the call routing unit comprise means for communicating with each other using call control messages.

6. A system according to. claim 5, characterized in that it further comprises a gateway element connecting said system to a second telecommunication system, said gateway element comprising means for transmitting and receiving a real-time data stream using a certain protocol supporting real-time data transmission and means for communicating with the call routing unit using call control messages.

7. A system according to claim 1, characterized in that the system further comprises in the server unit an interfacing unit, said interfacing unit providing a certain telecommunication application programming interface exposing services of a second packet network telecommunication system for use by other programs.

8. A system according to claim 7, characterized in that the server unit comprises a first server unit having means for providing telecommunication application functionality and a second server unit having the interfacing unit, and in that the first and second server unit are arranged to communicated with each other using call control commands.

9. The system of claim 1 wherein the control unit includes computer program code for causing the network element to switch, in the packet telecommunication network, a connection between the client unit and the communication device.

10. The system of claim 1 wherein the client unit interacts directly with the packet telecommunication network only using real time and real time control protocols.

11. The system of claim 1 wherein the client unit does not include an interface program that interfaces with the packet telecommunication network and that enables exchange of call control commands with the packet telecommunication network.

12. The system of claim 1 wherein the server unit appears, to the packet telecommunication network, to be an originator of the first call control commands, despite the client unit being the originator of the first call control commands.

13. The system of claim 1 wherein modifying the first call control commands received from the client unit in the first format to the second format comprises adding additional information to the first call control commands received from the client unit.

14. The system of claim 1 wherein the control unit includes means for transmitting, over the communication channel to the client unit, additional information added to the first call control commands in an update message.

15. A server unit for a packet network telecommunication system, the server unit comprising:
a control unit for controlling client applications further comprising:
module configured to receive, over a communication channel from a client unit, first call control commands that are in a first format,
an interface unit configured to:
modify the first call control commands received from the client unit in the first format to a second format used by a network element in a packet telecommunication network that is different than the communication channel,
direct the network element to perform a call control action that enables establishment of a connection, over the packet telecommunication network, between the client unit and a communication device that is different than the server unit and the network element by transmitting, over the packet telecommunication network to the network element, the modified first call control commands,
receive, over the packet telecommunication network from the network element, second call control commands that are in the second format,
modify the second call control commands received from the network element in the second format to the first format, and
a module configured to transmit, over the communication channel to the client unit, the modified second call control commands to enable the client unit to transmit, directly to the packet telecommunication network, a data stream, using a certain protocol supporting voice data transmission, for delivery to the communication device.

16. A server unit according to claim 15, characterized in that it further comprises an interfacing unit providing a certain telecommunication application programming interface exposing services of a second packet network telecommunication system for use by other programs.

17. A system comprising:
a client unit and a server unit, which has a control unit, wherein:
the client unit is configured to receive and transmit, over a packet telecommunication network to a communication device that is different than the server unit, a data stream using a certain protocol supporting voice data transmission,
the client unit is further configured to transmit, over a communication channel to the control unit, first call control commands that are in a first format, the communication channel being different than the packet telecommunication network,
the control unit is configured to receive, over the communication channel from the client unit, the first call control commands that are in the first format,
the control unit is further configured to modify the first call control commands received from the client unit in the first format to a second format used by a network element in the packet telecommunication network, the network element being different than the communication device,
the control unit is further configured to direct the network element to perform a call control action that enables establishment of a connection, over the packet telecommunication network, between the client unit and the communication device by transmitting, over the packet telecommunication network to the network element, the modified first call control commands,
the control unit is further configured to receive, over the packet telecommunication network from the network element, second call control commands that are in the second format,
the control unit is further configured to modify the second call control commands received from the network element in the second format to the first format,
the control unit is further configured to transmit, over the communication channel to the client unit, the modified second call control commands, the client unit is further configured to receive, over the communication channel from the control unit, the modified second call control commands, and the client unit is further configured to, based on the modified second call control commands, transmit, directly to the packet telecommunication network, the data stream for delivery to the communication device.

18. The system of claim 17 wherein the client unit docs not include an interface program that interfaces with the packet telecommunication network and that enables exchange of call control commands with the packet telecommunication network.

19. The system of claim 17 wherein the server unit appears, to the packet telecommunication network, to be an originator of the first call control commands, despite the client unit being the originator of the first call control commands.

* * * * *